United States Patent [19]

Schawer

[11] Patent Number: 5,953,730
[45] Date of Patent: Sep. 14, 1999

[54] COMPUTERIZED CONVERSION OF TABLES

[75] Inventor: Wolfgang Schawer, Holzgerlingen, Germany

[73] Assignee: International Business Machines Corporation, Armonk, N.Y.

[21] Appl. No.: 08/809,063

[22] PCT Filed: May 23, 1995

[86] PCT No.: PCT/EP95/01965

§ 371 Date: Mar. 12, 1997

§ 102(e) Date: Mar. 12, 1997

[87] PCT Pub. No.: WO96/13782

PCT Pub. Date: May 9, 1996

[30] Foreign Application Priority Data

Oct. 26, 1994 [DE] Germany ............................ 44 38 120

[51] Int. Cl.⁶ .................................................. G06F 12/00
[52] U.S. Cl. ........................................ 707/503; 707/906
[58] Field of Search ................................ 395/500, 707;
    704/2, 7; 707/3, 102, 104, 503, 509; 705/36

[56] References Cited

U.S. PATENT DOCUMENTS

| | | | |
|---|---|---|---|
| 4,989,141 | 1/1991 | Lyons et al. ............................. | 705/36 |
| 5,055,998 | 10/1991 | Wright et al. ........................... | 707/503 |
| 5,119,465 | 6/1992 | Jack et al. ................................ | 395/500 |
| 5,293,615 | 3/1994 | Amada .................................. | 707/509 X |
| 5,457,792 | 10/1995 | Virgil et al. ............................... | 707/3 |
| 5,493,671 | 2/1996 | Pitt et al. ................................ | 395/500 |
| 5,537,591 | 7/1996 | Oka ........................................ | 707/102 |

OTHER PUBLICATIONS

MVS / ESA—Resource Measurement Facility—Version 4 General Information / GC28–1028–3 IBM Corporation, Mar. 1991.

*Primary Examiner*—Zarni Maung
*Assistant Examiner*—Patrice L. Winder
*Attorney, Agent, or Firm*—Gray Cary Ware Freidenrich

[57] ABSTRACT

The IBM "Resource Measurement Facility" (RMF) program can be used to acquire data, for instance, concerning the performance of a computer system. The data are in RMF format and in the form of a table. The invention makes it possible to convert the data acquired by the RMF program from the RMF format to a format compatible with LOTUS 1-2-3™ spreadsheet programs. Furthermore, certain data, e.g., certain lines (10, 12) or columns (11) are automatically provided with a symbolic name. These symbolic names correspond to the so-called "range names" of LOTUS 1-2-3 spreadsheet programs. All the data acquired by the RMF program are thus converted by the invention in such a way that they can be further processed, without any limitations, by a LOTUS 1-2-3 spreadsheet program.

12 Claims, 4 Drawing Sheets

COMPUTERIZED CONVERSION OF TABLES

BACKGROUND OF THE INVENTION

1. Field of the Invention

The invention relates to the computer-aided conversion of an assemblage of digital data in a first data format to an assemblage of digital data in a second data format, where the data in the second data format is collected in tabular format and is suitable for use in a spreadsheet program.

2. Description of the Related Art

Activity monitoring programs are known. With an activity monitoring program, for example, the performance of a computer system can be recorded and displayed to a user. Such programs work closely with the computer operating system and produce data, for example, reflecting the capacity utilization of the computer system, the access and response times of the computer system, and the like. These data are present in a first data format which is dependent upon the activity timer program. The data are collected by the activity timer program into a report which is given a tabular format through the introduction of spaces and line feeds. The report can be displayed to the user on a screen and/or saved in the memory of the computer system.

Spreadsheet programs are also known, with which any desired data can be processed. These data must exist in a second data format compatible with the spreadsheet program. The data in tabular form can be displayed to the user on the screen in a variety of graphical presentations. Certain lines (rows) or certain columns, or even certain values from the tables can be referred to by the user with the aid of symbolic names. It is likewise possible to carry out calculations or other combinations and to integrate the results again as data in the tables. Finally, the data from spreadsheet programs can frequently be transferred to other programs such as word processing programs.

In the past, if it was desirable or necessary to submit data from reports of activity monitoring programs to further processing using spreadsheet programs, the desired data had to be entered, for example, by a user into the spreadsheet program using the computer system keyboard in a manual fashion. The tabular format of the data had to be taken into account in doing this. The associated disadvantages are obvious.

SUMMARY OF THE INVENTION

The main task of the invention is to automate the conversion of data from activity monitoring programs into data for spreadsheet programs.

This task is achieved in a process of the type described in the preamble: data in the second data format are produced from data in the first data format and a symbolic name is assigned to one or more of the data in the second data format. In this way the invention creates a link between the activity monitoring program and the spreadsheet program. The data in the first data format, namely those of the activity monitoring program, are converted into data in the second data format, namely into spreadsheet program data. The tabular nature of the data is maintained. Thus it is possible for data from the activity monitoring program to be further processed by the spreadsheet program.

In addition, certain of the spreadsheet program data produced in this way are given a symbolic name. This means, for example, that a column or row or even an individual data item from the table resulting from the assemblage of data can be referred to under a symbolic name. In this way, it is no longer necessary for a user to refer laboriously to one or more of the data in a table by their current position(s) in the table, but it is sufficient for the user to refer to the data by the symbolic name assigned. The invention thus achieves not merely the conversion of data from the activity monitoring program into data for the spreadsheet program but, in addition, by assigning a symbolic name, allows access to a simpler and more rapid processing of the data in the spreadsheet program.

It is possible, on the one hand, in converting the data from the first to the second data format on the basis of the foregoing criteria, for the computer system to assign a symbolic name to certain columns or certain rows. The symbolic name can thus be produced by the computer as desired or assigned as a function of the specific columns or lines.

On the other hand, it is possible that the activity monitoring program can produce one or more different standard reports. This means that the standard report contains certain, partially differentiated data in tabular form. These data and the tabular form mentioned are always the same in the case of the self-same standard report. Consequently, it is possible, before carrying out any conversion, that symbolic names are produced on the basis of such standard reports and stored in a structure list. Thus certain columns or lines of the current standard report are provided with certain symbolic names. In general terms, this means that the structure or the tabular construction of the standard report is converted into the individual symbolic names of the structure list. If there is now such a standard report for conversion from the first data format into the second data format, the symbolic name or names can be taken directly from the structure list and the associated data assigned to the second data format.

It is particularly advantageous if the data of the second data format and/or the symbolic names are produced in such a way that they can be processed by LOTUS 1-2-3™ spreadsheet programs or other compatible spreadsheet programs. (LOTUS 1-2-3 is a trademark of Lotus Development Corporation).

BRIEF DESCRIPTION OF THE DRAWINGS

Other advantageous designs of the invention are shown in the following specific examples, which are explained by means of the diagrams.

DETAILED DESCRIPTION OF THE INVENTION

With the aid of the IBM "Resource Measurement Facility" (RMF), it is possible, for example, to record the capacity of a computer system. For this purpose, the RMF program can, in conjunction with the computer operating system, investigate and prepare a report on certain data that allows the capacity of the computer system to be evaluated. In the report, these data exhibit an RMF data format, which is predetermined by the RMF program. The data can be prepared by the RMF program in such a way that they form a table. For this purpose, blanks and/or linefeeds are inserted between the data, so that the data form individual lines and columns and hence are arranged in a tabular format. It is also possible for the data in the report to be provided with headings. This can be done by line or by column.

Figure 1:
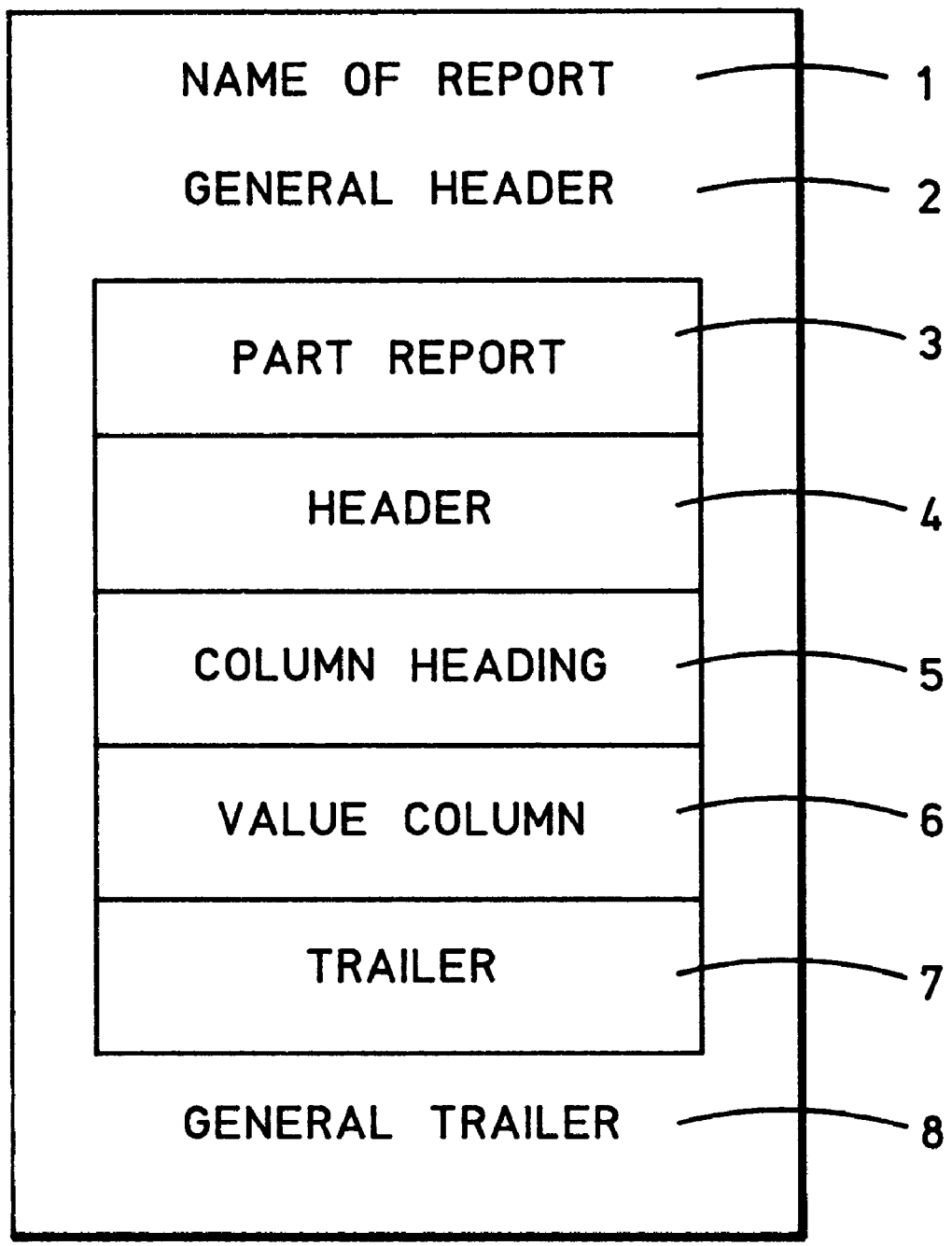
FIG. 1 is a schematic representation of the general structure of a standard report, in the case of the IBM "Resource Measurement Facility" program.

The RMF program makes available a number of pre-formatted reports, each of which have certain data summarized. Pre-defined assemblages of data of this type are also described as "standard reports." All these standard reports of the RMF program have a general structure which is shown diagrammatically in FIG. 1. Corresponding to FIG. 1, at the beginning of a standard report is the report name 1 and hence the designation of the report. Following this is a general header 2 which, for example, provides further explanation or contains comments on the report. Thus it is possible for the report name 1 also to be a constituent of the general header 2. After this general header 2 follows a plurality of part reports 3. For the sake of simplicity, only one part report 3 is shown in FIG. 1. It should be understood, however, that several such part reports 3 may be contained in sequence in the standard report.

In accordance with FIG. 1, a part report 3 consists of a header 4, of column headings 5, of value columns 6 and of a trailer 7. The header 4 contains, as in the case of the general header 2, further explanation or comment on the relevant part report 3. The column headings 5 describe in more detail the data which are contained in the subsequent value columns 6. Thus, it is possible that the column headings 5 are arranged hierarchically and hence that several subordinate column headings belong to a main column heading, etc. As mentioned, the individual data are contained in the value columns 6; for example, the data on the capacity of the computer system. A trailer 7 may again contain explanations or comments or also summaries or results of the corresponding associated columns.

After the part report(s) 3, a general trailer 8 is provided in accordance with FIG. 1 which, as with the trailer 7 in the case of part reports 3, contains in particular summaries or special statistical results of the preceding columns.

With the general structure of a standard report shown in FIG. 1, it is possible to eliminate the header 4, in particular, to a part report 3 but also the general header 2 and, if relevant, also the trailer 7 to a part report 3 or the general trailer 2. This depends on the current use of the standard report and can be selected by the user accordingly.

On the basis of the general structure of a standard report shown in FIG. 1, the RMF program makes available to the user, as mentioned, a number of standard reports. In these different standard reports certain data are in each case summarized in different ways. It is thus possible, for example, that in a first standard report, certain capacity data are recorded half-hourly and are summarized over the course of a day. In another standard report, it is possible, for example, that other capacity data are recorded daily and summarized over the course of a month. In this way, the various standard reports make it possible to emphasize certain capacity characteristics of the computer system.

Each of these standard reports has a particular tabular format, in which the individual data are listed and a user indicated. In addition to the data, this tabular format also contains, as shown in FIG. 1, the name of the report 1, a general header 2, a header 4 to each part report 3, etc. The position of the data as well as the above-mentioned comments, is unambiguously laid down for each standard report and cannot be changed.

On the basis of these predetermined standard reports, structure lists are produced and made available to the user of the RMF program. A structure list is assigned to each standard program and stored in the computer. The structure lists represent a mirror image of the structure of each corresponding standard report. This means that in the structure lists, the individual lines and columns are present in a manner similar to that of the standard report. The structure lists, however, do not contain not the data or the above-mentioned special comments, but rather a plurality of symbolic names. If, for example, a complete line in a standard report is provided for the report name 1 of the standard report, then the corresponding structure list will contain the symbolic name under which the report name 1 can be referred to by a user. For example, if in a part report 3 of a standard report a part of a line is provided for a trailer 7, then the structure list will contain, in the corresponding part of the line, the symbolic name under which the user can refer to the trailer 7.

In this way, the symbolic names of the individual value columns 6, column headings 5 etc., with the aid of which the user can refer to the corresponding data etc. in the part report 3, are contained in the structure list.

The symbolic names held in the structure lists are selected in such a way that they correspond to the so-called "range names" of the LOTUS 1-2-3 spreadsheet program and can be further processed in the same way.

Figure 3:
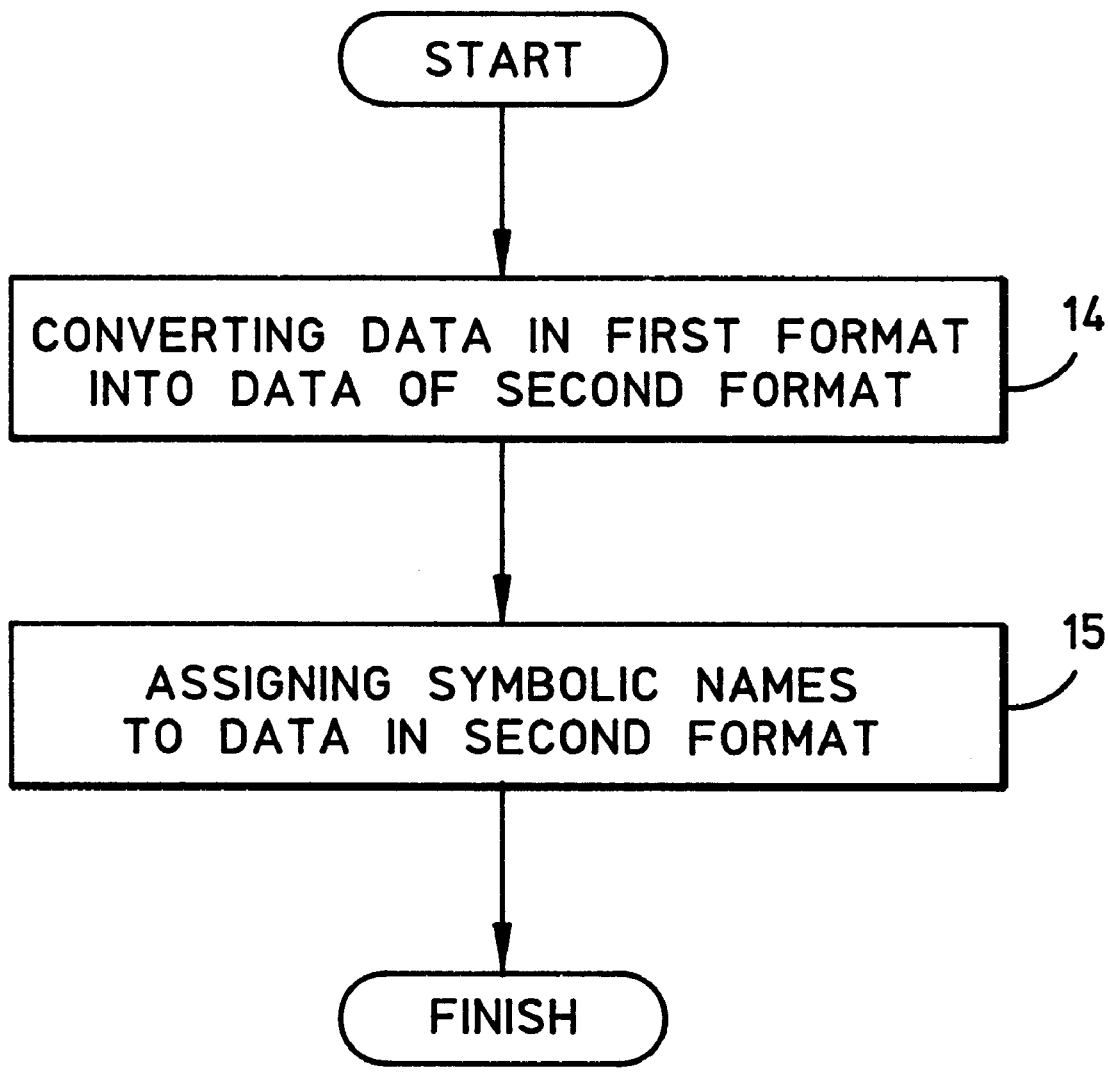
FIG. 3 is a flowchart of the method of converting a standard report to a spreadsheet format.

Referring to a flowchart of FIG. 3, if a standard report has been produced by the RMF program and stored in the computer system, then the individual data of the standard report will be converted by the computer system in a first step (step 14), in such a way that they can be further processed by a LOTUS 1-2-3 spreadsheet program. This means that standard report data present in RMF format are converted to a format compatible with LOTUS 1-2-3 spreadsheet programs. In a similar manner, even blanks and/or linefeeds, where required in each case, will be converted to a format compatible with LOTUS 1-2-3 spreadsheet programs in such a way that the tabular format of the standard report remains unaltered.

In a further step (step 15), which can also be integrated into the aforementioned first step, certain data are each assigned a symbolic name corresponding to the structure list. As mentioned, these symbolic names correspond to the "Range Names" of LOTUS 1-2-3 spreadsheet programs.

Altogether, the standard report is now in the format compatible with LOTUS 1-2-3 spreadsheet programs, and moreover, contains symbolic names which can be processed by LOTUS 1-2-3 spreadsheet programs. The standard report is thus completely converted to a form which can be further processed by LOTUS 1-2-3 spreadsheet programs. The converted standard report, including the symbolic name(s), is stored in the computer system.

Because of the wide distribution of LOTUS 1-2-3 spreadsheet programs, it is possible that data which can be processed by such programs can also be further processed by other spreadsheet programs. In this way, the standard report can be bather processed by a user not only with LOTUS 1-2-3 spreadsheet programs, but also using other spreadsheet programs.

It is also to be understood that the data from the RMF format can be converted not only into a format compatible with LOTUS 1-2-3 spreadsheet programs, but that direct conversion into the format of other spreadsheet programs may also be carried out. In this case, it is possible that the symbolic names correspond to other data region descriptions or the like.

Figure 2:
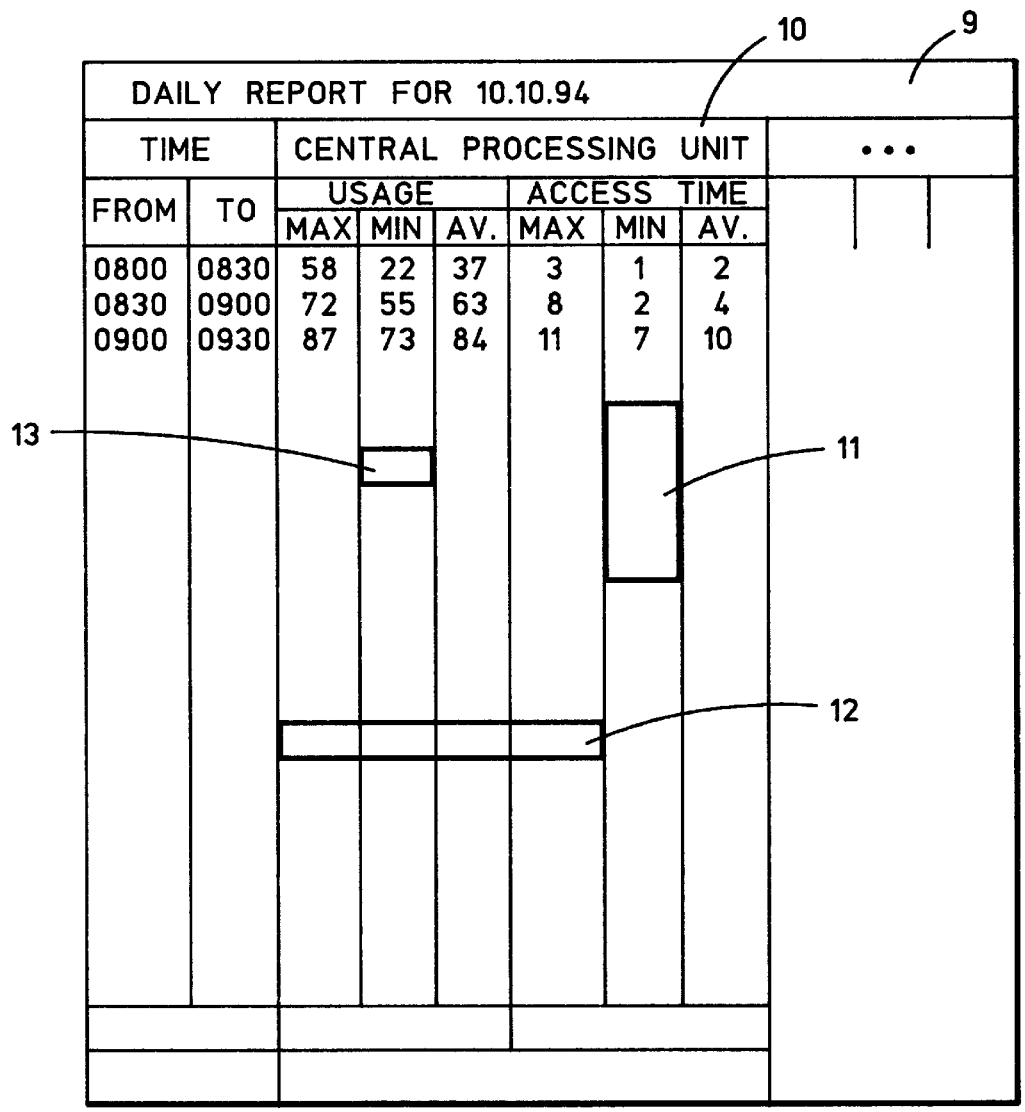
FIG. 2 is a model example of a specific standard report in which individual values, columns or rows, are particularly emphasized

In FIG. 2, a daily report is shown as an exemplary standard report. In this daily report, the maximum, minimum, and average capacity, and corresponding access times to the central processing unit of a computer system are given in half-hourly intervals. The data are recorded by the RMF program and then converted from the RMF format into a format compatible with LOTUS 1-2-3 spreadsheet programs. The headings to the individual columns are likewise produced by the RMF program and converted to the format compatible with LOTUS 1-2-3 spreadsheet programs. The tabular format of the daily report of FIG. 2 is identical in the RMF format and in a format compatible with LOTUS 1-2-3 spreadsheet programs.

Figure 4:
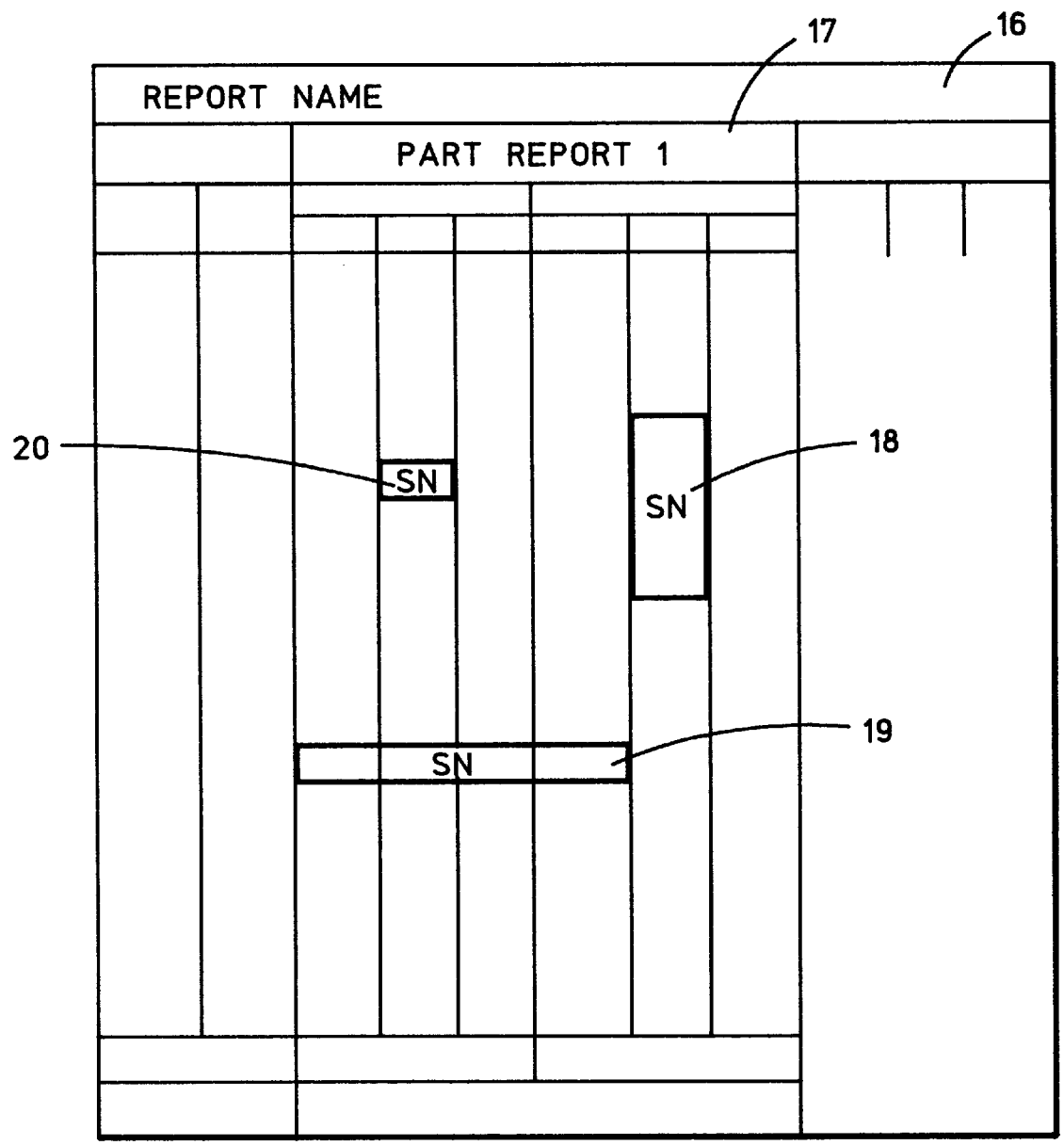
FIG. 4 is an illustration of an exemplary structure list corresponding to the standard report of FIG. 2.

An exemplary structure list of FIG. 4 relating to the standard report shown in FIG. 2 has essentially the same structure as the daily report. In this structure list, the first line 9 of the daily report of FIG. 2, for example, is assigned the symbolic name "Report name" 16 of FIG. 4. Correspondingly, each part 10 of the second line of FIG. 2 which, contains the heading "Central Processing Unit" in the daily report, is given the symbolic name "Part report 1" 17 in the structure list of FIG. 4. It is also possible here for the symbolic name to be identical to the heading. In this way, each heading in the daily report of FIG. 2 is assigned a symbolic name in the structure list of FIG. 4.

In addition, every column or every part 11 of a column of FIG. 2 is likewise assigned a symbolic name 18 of FIG. 4. The same applies quite generally for every line or every part 12 of a line of FIG. 2 (corresponding with a symbolic name 19 of FIG. 4). Finally, it is also possible to provide an individual datum 13 of FIG. 2 with a symbolic name in the structure list (corresponding with a symbolic name 20 of FIG. 4).

The general result is that the user thus has the standard report of FIG. 2 in a format compatible with LOTUS 1-2-3 spreadsheet programs, together with a plurality of symbolic names which, as explained, correspond to the "range names" of LOTUS 1-2-3 spreadsheet programs. The user can in this way, for example, address the heading "Central Processing Unit" through the symbolic name "Part report 1" and, for example, change it. In the same way it is possible for the user to address individual or several data of the daily report directly through the corresponding symbolic names and, for example, link them together. As is generally possible with spreadsheet programs, the results can then be inserted back into the standard report with the aid of the existing symbolic names.

I claim:

1. A method for converting an assemblage of digital data from a first data format to an assemblage of digital data in a second data format by means of a computer system, where the data of the second data format are in tabular format and suitable for processing using a spreadsheet program, the method comprising the following steps:

converting data in the first data format into data of the second data format; and assigning symbolic names from a stored predetermined structure list to data of the second data format.

2. The method in accordance with claim 1, in which for a given assemblage of data of the first data format the symbolic names assigned to the data of the second data format are taken from a stored predetermined structure list associated with a standard report from which the data of the first data format was taken from.

3. The method in accordance with claim 1, in which the given assemblage of data in the first data format is associated with a predetermined standard report, the method further comprising:

generating the assemblage of data in the first data format; and prior to generating the assemblage of data in the first data format, generating the stored predetermined structure list based on the predetermined standard report, the stored predetermined structure list containing the symbolic names.

4. The method in accordance with one of the claims 1 to 3, in which the assemblage of data in the first data formal is produced by an activity monitoring program.

5. The method in accordance with one of the claims 1 to 3, in which the data of the second data format are converted so as to be suitable for processing by a spreadsheet program.

6. The method in accordance with one of the claims 1 to 3, in which the symbolic names are produced so as to be suitable for processing as range names of a spreadsheet program.

7. A computer system for converting an assemblage of digital data in a first data format into an assemblage of data in a second data format, where the data of the second data format are assembled in tabular format and are suitable for processing with a spreadsheet program, with storage means, where the assemblage of data in the first data format is stored or was stored, and where the assemblage of data in the second data format is stored, wherein at least one symbolic name is stored and assigned to one or more of the data in the second data format when converting, the at least one symbolic name from a stored predetermined structure list associated with the assemblage of data of the first data format.

8. The computer system in accordance with claim 7, in which a structure list with a plurality of symbolic names is stored in the storage means.

9. A method for converting an assemblage of digital data from a first data format to an assemblage of digital data in a second data format by means of a computer system, where the data of the first data format are from a predetermined standard report and the data of the second data format are in tabular format and suitable for processing with a spreadsheet program, the method comprising:

generating and storing a predetermined structure list corresponding to the predetermined standard report, the predetermined structure list having a plurality of symbolic names; and after generating and storing, converting data in the first data format into data of the second data format and assigning data of the second data format with a plurality of symbolic names from the predetermined structure list.

10. The method according to claim 9, wherein the predetermined structure list has a plurality of symbolic names comprising range names of the spreadsheet program.

11. The method according to any one of claims 9 or 10, further comprising:

prior to converting, and after generating and storing the predetermined structure list, generating the assemblage of data of the first data format by an activity monitoring program.

12. A method of processing data, comprising:

providing a predetermined structure list based on a predetermined standard report;

generating an assemblage of data of a first data format from an activity monitoring program, the assemblage of data of the first data format associated with a standard report from which the predetermined standard report is based;

converting the assemblage of data of the first data format into an assemblage of data of a second data format, the assemblage of data of the second data format being suitable for input into a spreadsheet program; and assigning symbolic names from the predetermined structure list to data of the second data format for use in the spreadsheet program.

\* \* \* \* \*